J. H. HARTMANN.
SCRAPER.
APPLICATION FILED JAN. 3, 1917.
1,292,461.
Patented Jan. 28, 1919.
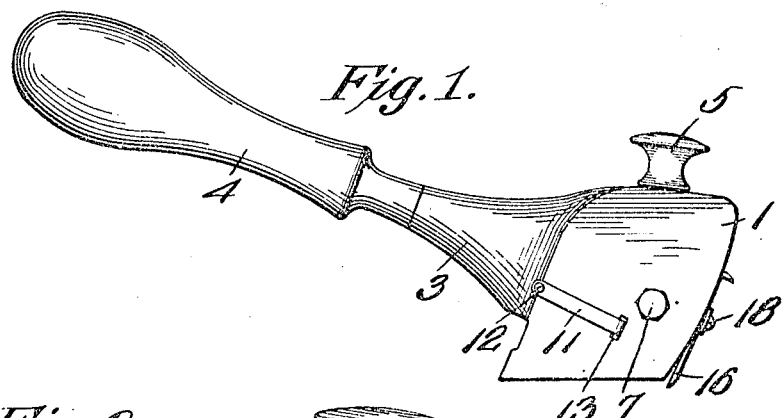
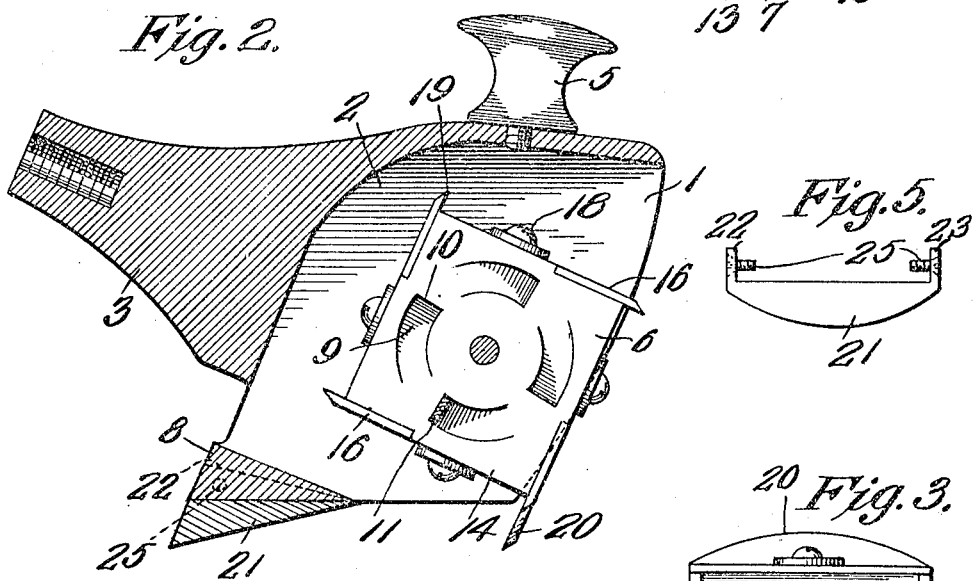
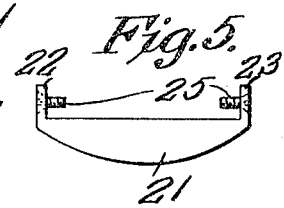
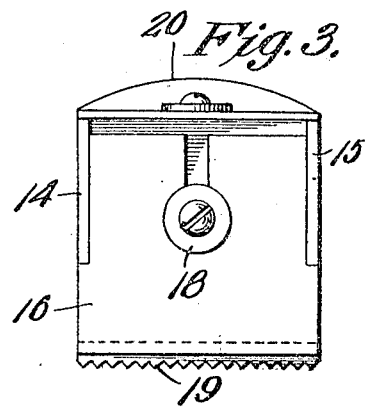
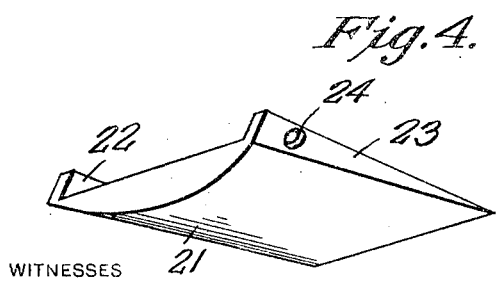
INVENTOR
John H. Hartmann,
BY Richard B. Owen,
ATTORNEY
WITNESSES
James F. Crown,
Lloyd W. Patch

UNITED STATES PATENT OFFICE.

JOHN H. HARTMANN, OF HOUSTON, TEXAS.

SCRAPER.

1,292,461. Specification of Letters Patent. Patented Jan. 28, 1919.

Application filed January 3, 1917. Serial No. 140,392.

*To all whom it may concern:*

Be it known that I, JOHN H. HARTMANN, a citizen of the United States, residing at Houston, in the county of Harris and State of Texas, have invented certain new and useful Improvements in Scrapers, of which the following is a specification.

This invention relates to improvements in scrapers, and more particularly to a combination scraper which can be used for scraping glue, wood, varnish, and the like, and so constructed to be used by hand.

An object of my invention resides in providing a device of this character which has a plurality of scraper blades of the same or of different character arranged in conjunction therewith and so mounted that the various blades can be brought interchangeably to the position for use and will be held in this position, thus making it possible to have a plurality of straight edged scraper blades which can be brought interchangeably to position as they may become dull by use, scraper blades in combination with beading blades for glue joints, and shaped edged blades for use in scraping molded surfaces, which blades of various characters will be disposed upon a revolubly mounted block and can be brought selectively to the operative position.

A further object lies in providing a rest upon which the scraping tool as an entirety can be brought to bear against the work and thus the depth to which the scraper blades cut can be regulated, and in providing means by which the revolubly mounted block securing the blades can be set to secure the same in a relation to present any one of the blades as mounted thereon for use.

Still another object is to provide a shoe which can be fitted to the case of the scraping tool to be received in the molded lines when irregular surfaces are being scraped and will thus guide the tool to present the shaped scraper in a position to accomplish the proper scraping or cutting action.

With the above and other objects in view, my invention consists in certain novel features of construction and combinations of parts which will be hereinafter set forth in connection with the drawings and then more particularly pointed out in the claim.

In the drawings:—

Figure 1 is a view in side elevation of the scraper with the parts adjusted to the position for use.

Fig. 2 is a sectional view taken through the scraper case to more clearly disclose the construction and arrangement of parts.

Fig. 3 is a detail elevational view showing the blade carrying block and illustrating the manner of connecting the scraper blades thereon.

Fig. 4 is a perspective view showing a shoe adapted for use in conjunction with a curved or rounded edge scraper blade.

Fig. 5 is a view in end elevation of the shoe as disclosed in Fig. 4.

The scraper case 1 is made up of a single casting which is hollowed out or left open as indicated at 2, although it will of course be understood as the description progresses that this case might be made up of several members constructed of sheet metal or as castings. The scraper case 1 has a stem 3 extending therefrom and a handle 4 is connected with the stem 3 and thus extends angularly from the case 1. A knob handle 5 is carried by the case 1, and by grasping the handle 4 with one hand and the knob 5 with the other the user can obtain a hold upon the scraper which permits the same to be drawn forward and at the same time have pressure exerted thereagainst at the case 1, through the medium of the hand knob 5.

A blade carrying block 6, which in the present instance is shown as being substantially square in cross section, is made of a size that it will fit within the opening left between the side walls of the scraper case 3, and bolts 7 are passed through bearing openings provided in the sides of the scraper case and into the block 6 to mount the same revolubly within the case. The revolving block 6 is made of such size that the structure thereof does not project from the sides of the scraper case. A rest shoe 8 is made in a form of a bar extending across between the lower edges of sides of the scraper case 1 and substantially beneath the stem 3. This rest shoe 8 is made of such width that it will give a bearing upon which the scraper may be rested after the manner of the rest accomplished by a plane block, but is not of sufficient width to interfere with the turning movement of the ratchet block 6. The block 6 has ratchet notches 9 provided on the ends thereof with the abutting walls 10 of the notches disposed to face away from the stem 3, and ratchet springs 11 are secured by the screws 12 on the ends of the scraper case 1 in such relation that the free ends thereof bend to extend inwardly at right angles and pass through openings 13 in the scraper case 1 will be received within the ratchet notches 9 of the block 6 and will hold the same against back turning movement or against turning in an anti-clockwise direction as illustrated in Fig. 2 although the ratchet springs 11 will not restrain turning movement of the block 6 in a clock-wise direction.

The various faces of the block 6 have the side ribs 14 and 15, and scraper blades 16 are provided with shanks shaped to be received between these ribs 14 and 15 in such a manner that as the scraper blades are fitted against the faces of the block 6, they will be held against lateral or twisting movement. The blades are each provided with these slotted openings 17 extending inwardly from the rear edge, and clamp screws 18 are screwed into threaded orifices provided in the block 6 and are thus held to be within the opening 17 as the scraper blades are fitted into place. As has been stated, the ribs 14 and 15 will hold the scraper blades against side or twisting movement, and the desired adjustment of the blades to secure proper extension of the sharpened edges thereof beyond the block 6 can be made, after which the clamp screw 18 can be tightened down and then the blades will be positively secured and locked upon the block in the desired relation. As is illustrated in Fig. 3, the sharpened edges of the blades might be serrated as indicated at 19, and these blades could be used in beading for glue joints, the sharpened edges might be made curved or rounded as shown at 20, and still other forms might be given to the cutting edges, or all the scraper blades as fitted to the head might be shaped to have straight or cutting edges. It is a purpose of my invention that the tool shall be adaptable for use in different connections or that a plurality of the scraper blades of like character shall be provided upon the single block or head 6 in such relation that when one edge has become dull, another blade can be brought to the position for use and thus the necessity of stopping when a single edge has been dulled and resharpening the blade, is overcome.

In the use of the scrapers, the blades will be adjusted and set in the proper position for use, and will be maintained in this position by tightening of the clamp screws 18, the revolving ratchet block 6 is then turned to bring the desired blade to the position where it has extension below that edge of the scraper case in conjunction with which the rest shoe 8 is formed, and then by grasping the handle 4 in one hand and the hand knob 5 in the other, the scraper can be moved or drawn forward, or in the direction toward the left hand as the parts are illustrated in Figs. 1 and 2, with the rest shoe 8 bearing against the work to be operated upon and the cutting edge of the scraper in the operative position will then scrape or cut from the surface of the work and will accomplish the desired purpose. When scraper blades all having the same form of sharpened edge are being employed, to bring a new cutting edge into position, it is only necessary to give slight turning movement to the revolving ratchet block 6, and the ratchet spring 11 will hold the block against return movement.

Where a curved or rounded edged blade is used as indicated at 20, it will of course be understood that the rest shoe 8 is not of proper configuration to accomplish the desired purpose, and I have therefore provided a detachable shoe 21 which is shown in Fig. 2, and when this shoe is fitted in place with the side flanges 22 and 23 thereof embracing the side of the scraper case 1 adjacent the rest shoe 8, the main portion of the shoe 21 which is curved or rounded out will be received beneath the bearing face of the rest shoe 8, and in consequence the shoe 21 will be presented in a relation that it may be moved in a molded or otherwise rounded space and will guide the scraper to bring the rounded or curved edge 20 of the blade to the proper scraping position.

From the foregoing it will be seen that I have provided a scraper which is not only adaptable for use in connection with flat surfaces or surfaces to be connected by glue joints, but which also may be used in scraping or smoothing down molded surfaces of any configuration, by simply changing the bearing shoe 21 and the configuration of the sharpened edge of the blade adapted for use therewith, and while in the foregoing I have shown and described only specific forms, it will be understood that a number of changes and variations in the form and arrangement of the several parts might be made without departing from the spirit and scope of my invention, and hence I do not wish to be limited to the exact disclosure, but only to such points as may be set forth in the claim.

I claim:

A scraper comprising a casing provided with a socket formed in the outer end thereof, a revolubly adjustable block journaled within said socket, a plurality of cutting blades adjustably supported upon said block, said block provided with a plurality of ratchet notches formed in one end thereof, a spring ratchet pawl secured to the outer end of said casing and projecting therethrough for engaging said notches and holding said block in a set position within said socket, said casing constituting an efficient bracing means for said spring ratchet pawl when pressure is brought to bear upon said block, and a rest shoe formed on said casing, upon the lower face thereof and near the rear end thereof for constituting a bearing for said casing while said scraper is in operation.

In testimony whereof I affix my signature in presence of two witnesses.

JOHN H. HARTMANN.

Witnesses:
A. J. DUGAN,
F. A. FRAIR.

Copies of this patent may be obtained for five cents each, by addressing the "Commissioner of Patents, Washington, D. C."